Dec. 19, 1950   H. COLEMAN   2,534,501
VEHICLE BODY CONSTRUCTION
Filed Oct. 4, 1947   3 Sheets-Sheet 1
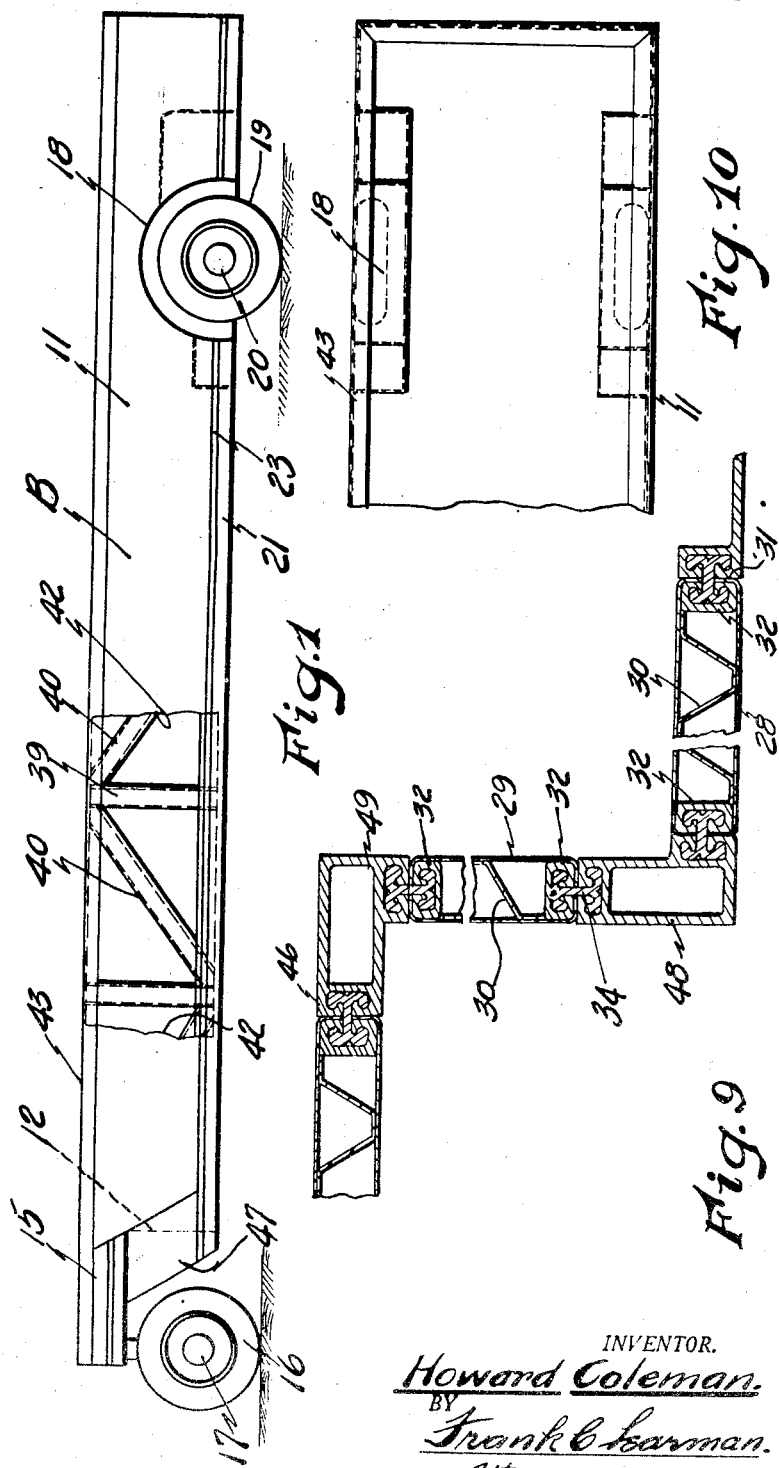
INVENTOR.
Howard Coleman.
BY
Frank C. Isarman.
Attorney.

Dec. 19, 1950 H. COLEMAN 2,534,501
VEHICLE BODY CONSTRUCTION
Filed Oct. 4, 1947 3 Sheets-Sheet 2
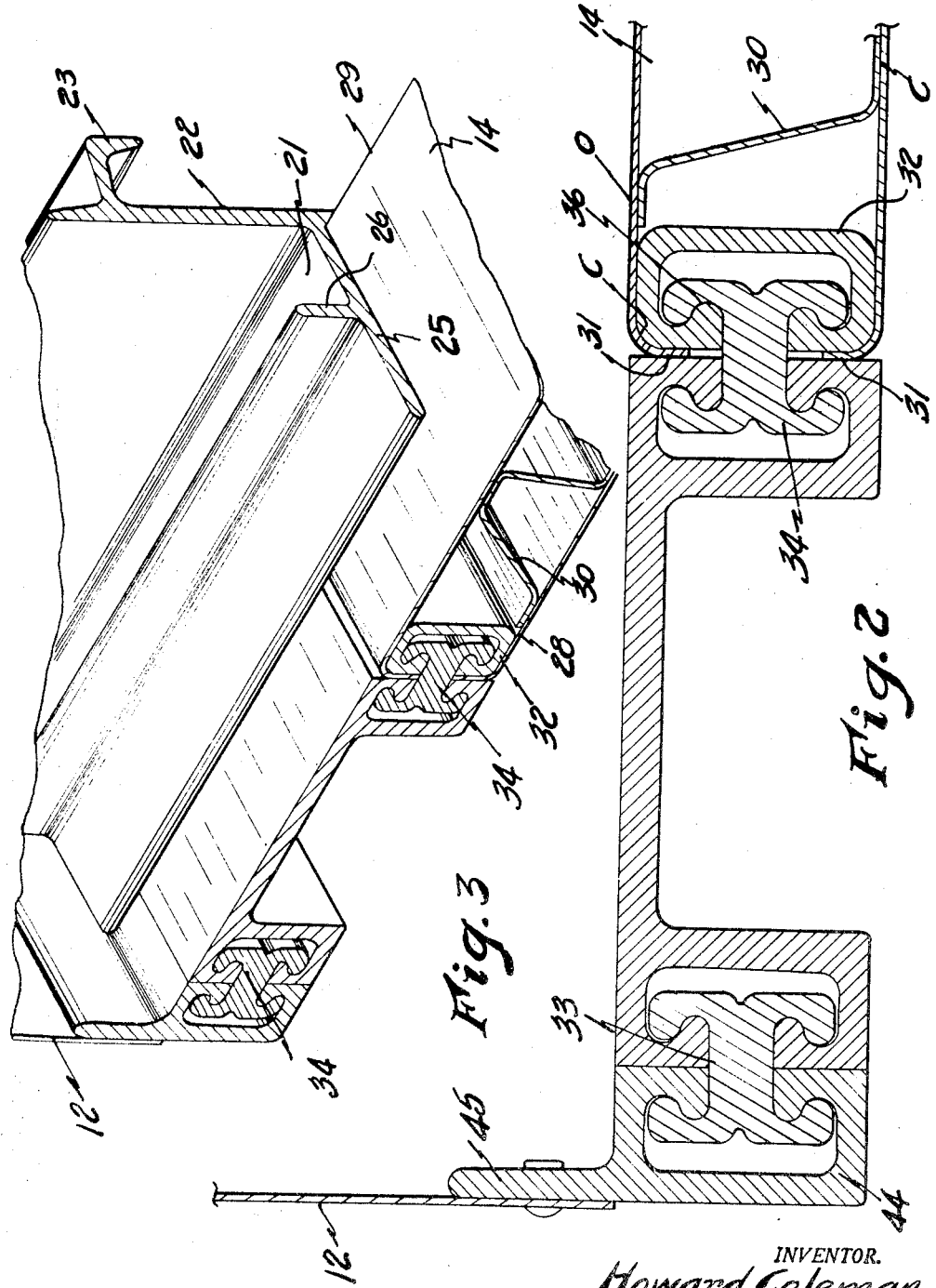
INVENTOR.
Howard Coleman.
BY Frank C. Kanman.
Attorney.

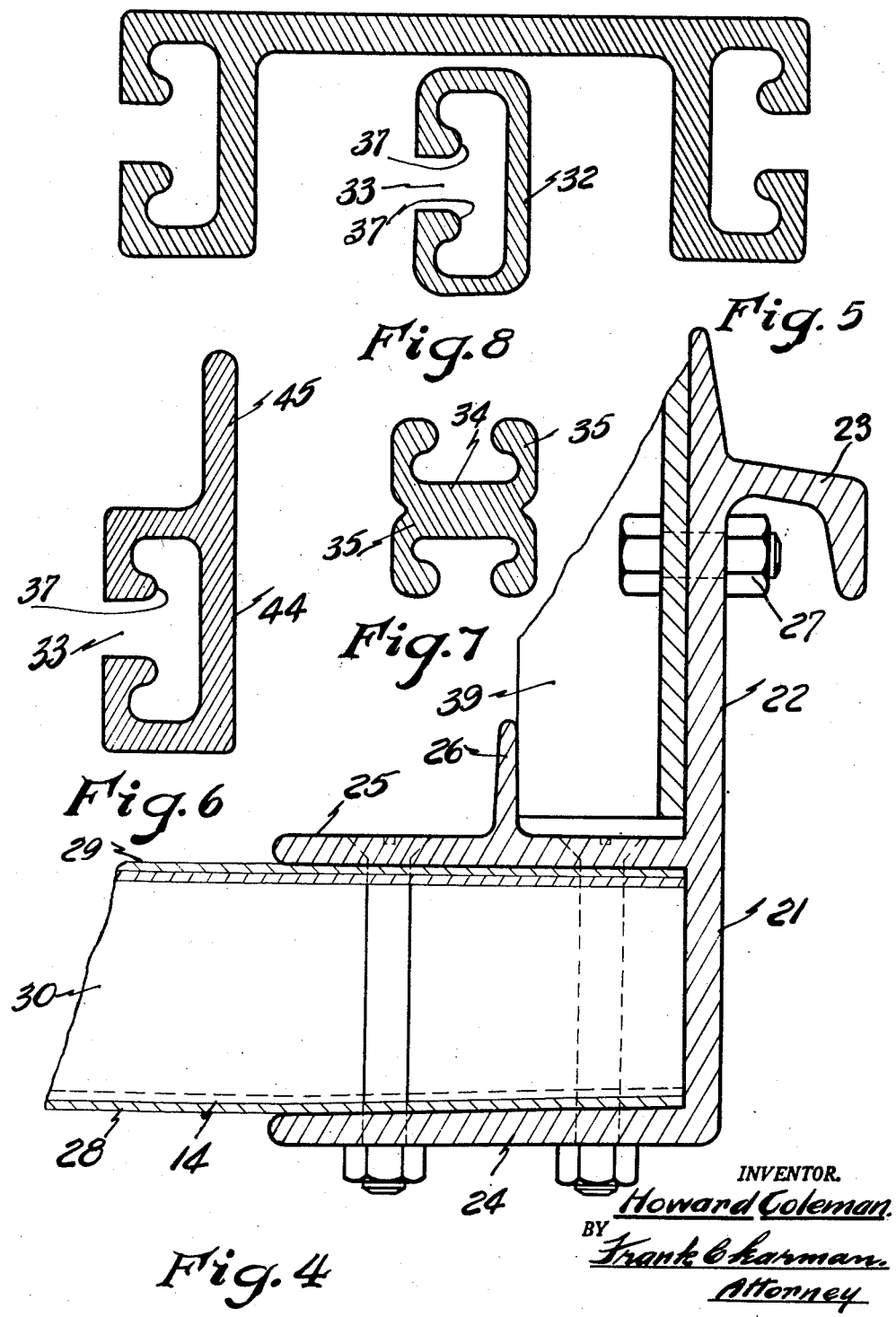

Patented Dec. 19, 1950

2,534,501

UNITED STATES PATENT OFFICE 2,534,501

VEHICLE BODY CONSTRUCTION

Howard Coleman, Bay City, Mich.

Application October 4, 1947, Serial No. 777,979

5 Claims. (Cl. 296—28)

This invention relates to vehicle bodies of the type used on busses, trucks, freight coaches or on trailers which are adapted to be drawn by a prime mover such as an automotive unit, and is more particularly directed to body construction which has numerous inherent advantages embodied therein.

One of the prime objects of the invention is to design a vehicle body of very light, yet strong and sturdy construction, which is capable of sustaining heavy loads to which it is subjected in use.

Another object is to design an extremely lightweight body construction capable of hauling materially heavier loads than any comparable construction at present on the market.

A further object is to provide a body construction in which the interior of the body is clear and unobstructed throughout its entire load carrying area, and which has no raised or projecting shoulders etc. other than the wheel housings, thus materially facilitating the loading, unloading, and/or handling of the load being carried.

A further object still is to design a body having an exceptionally strong, lightweight, shallow depth floor, so constructed and arranged as to materially enhance the strength of the body.

Still a further object is to provide an interlocking sandwich floor panel construction, which firmly grips and seals the ends of the outer skin or sheet, forming a moisture and corrosive proof joint thereat, and eliminating any so-called peeling of the sheet at the point of connection.

A further object is to design a body of simple, practical, and substantial construction, which can be readily and economically manufactured and assembled, which eliminates labor, and in which the interlocking sections are readily interchangeable.

Still a further object is to provide a body construction in which the bottom face of the floor has no depending sections or shoulders, making it particularly adaptable for operation over rough terrain, and further eliminating the possibility of mud, ice and snow clinging to the bottom face and hanging thereon.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side-elevational view showing my improved vehicle body design.

Fig. 2 is an enlarged, fragmentary, longitudinal section through the floor.

Fig. 3 is also an enlarged, fragmentary, sectional view, showing the floor and side girder.

Fig. 4 is an enlarged, fragmentary, transverse-sectional view through the floor and side girder.

Fig. 5 is also a transverse-sectional view showing one of the interlocking floor beam sections.

Fig. 6 is a transverse sectional view showing one of the front interlocking floor beam sections.

Fig. 7 is a similar view of one of the locking floor beam sections.

Fig. 8 is a transverse-sectional view of one of the C-shaped beam sections.

Fig. 9 is a transverse-sectional view showing an alternate construction for the kick-up section of the body.

Fig. 10 is a fragmentary, plan view of the body.

Referring now more specifically to the drawings in which I have shown one embodiment of my invention, this embodiment being incorporated in a vehicle of the bus or trailer type, which can be either self-propelled or drawn by a prime mover of any type (not shown), it being understood that the instant illustration is intended merely as representative and is not to be construed as limiting, as the various features comprising the invention may be embodied in various types of vehicles, either with or without their own power plants.

The vehicle body is indicated generally at "B" and comprises side and front walls 11 and 12, respectively. The floor is indicated at 14 and a kick-up section 15 is provided at the front end of the body, this front end being supported on wheels 16 which are mounted on an axle 17 which can be provided on the body in any approved manner.

Wheel housings 18 are provided in the body side walls 11, and rear wheels 19 are revolvably mounted on an axle 20, and I shall not show or describe the axle construction in detail, as it forms the subject matter of a separate application to be filed.

Each of the side walls 11 includes a longitudinally disposed box-shaped girder member 21, formed with a vertically extending side wall 22, having a guard rail section 23 formed integral therewith and adjacent to the upper edge thereof, the lower end having inwardly projecting, vertically spaced legs 24 and 25 which accommodate the ends of the floor 14 therebetween, a raised rib 26 being formed integral with the leg 28, said rib and vertical section 22 forming a longitudinal channel in which the side walls 11 are set as usual and which are secured thereto by means of bolts 27 or the like.

The floor 14 is manufactured in sections, each section comprising upper and lower floor plates 28 and 29, and a reinforcing web 30 is interposed therebetween, said web being bent or formed as corrugations extending the length and width of the panels, the ends of the plates 28 and 29 being rounded and bent downwardly as at 31 so that they closely fit the rounded face of the C-shaped beam section 32; "Cycleweld" cement (not shown) is then placed on the contacting faces C of the web, beam, and top and bottom plates, all of which are then taped together, and then by use of heat and pressure, the members are welded to form a one-piece sandwich panel; this however, can be secured in any other desired manner.

The C-shaped sections 32 are preferably in the form of an extrusion, and when the panels are placed in edge-to-edge relation, the openings 33 in the sections are disposed in horizontal alignment.

The locking floor beams or sections 34 are also extrusions and are insertable from the ends of the beam sections 32, the main body being accommodated in the openings 33 and the wings 35 are formed with channel-shaped sections 36 adapted to slidably accommodate the rounded rib sections 37 of the beam sections 32, thus firmly locking the beam sections together and tightly wedging the rounded ends 31 of the plates 28 and 29 therebetween, forming a weathertight, corrosive-proof joint, and securely anchoring the ends of the plates 28 and 29 so there will be no peeling or release of the plates that form the skin of the floor.

The side paneling can be of any desired design, and in the instant application I prefer to use a plurality of vertical posts or standards 39 with diagonally disposed braces 40 therebetween. These are bolted to the section 22 by means of the bolts 27, the outer surface being covered by plate 42 as usual, and an angle 43 is secured to and forms the top edge of the side walls as shown.

In certain types of vehicles it is desirable to provide a vertical plate 12, at the front end of the load-carrying space (see Figs. 2 and 3 of the drawings), and in this construction I provide a beam 44 which is similar to the C-shaped beam 32 with the exception that a vertical rib 45 is formed integral therewith, to which the end of the plate 12 is riveted or otherwise secured.

The horizontal section 46 of the kick-up is formed substantially similar to and is a continuation of the floor, the upper end of the plate 12 being welded thereto, and diagonally disposed braces 47 are provided on the side walls of the body to reinforce the structure. The rear end of the body can be open, or a gate (not shown) can be provided as desired.

In Fig. 9 of the drawings, I have shown a slightly modified construction in which the plate 12 is omitted, and corner beams 48 and 49 are provided as shown, one end of the C-shaped section is adapted to be connected to the floor, while on the opposite end, the C-shaped section is disposed for connection in the opposite plane, and these can be readily locked to the C-shaped beam sections 32 previously described.

The floor 14 is made up of panels of predetermined length and width; these are very easy and economical to manufacture and assemble. They are very light in weight, being preferably formed of magnesium, aluminum, or other lightweight alloy, all of which are welded together to provide a strong, rigid panel.

The manner of connecting or locking the panels together is also a unique feature, this locking beam being also formed of lightweight metal; it interlocks with the C-shaped beam sections to firmly lock the panels in edge-to-edge relation, while the one-piece side girders engage the side edges of the panels to form a rigid structure, thus providing a smooth bottom face which can be skidded over snowbanks, sandbanks, obstacles of any nature, or utilized in any manner desired.

The body is also especially adaptable for military purposes; by caulking the seams it forms a perfect landing barge capable of accommodating a large number of men, and its flat bottom and unobstructed side walls insure easy propulsion in water, swamps, or other difficult terrain.

From the foregoing description, it will be obvious that I have perfected a very simple, practical and relatively lightweight construction which has great load carrying capacity at minimum cost.

What I claim is:

1. A vehicle comprising a body including sides, the lower portions of which are in the form of longitudinally disposed girders extending the length of the body, a plurality of floor panel sections spanning said girders and secured thereto, each panel comprising spaced-apart upper and lower sheets, a substantially corrugated web interposed between said sheets and secured thereto, hollow beam sections C-shaped in cross section to provide an elongated slotted opening in one side wall thereof, said beams being secured to the edges of and forming a part of each panel section, and locking means slidable in said slotted openings and in interlocking engagement with said beams for rigidly securing the panel sections in edge-to-edge relation.

2. The combination set forth in claim 1 in which the ends of the upper and lower sheets are rolled over the top face and onto the outer vertical face of the beams for tightly clamping the ends of the sheets when the sections are assembled in interlocking relation.

3. A vehicle comprising a body including a floor and side walls, the lower portion of each side wall terminating in a longitudinally disposed girder, said floor comprising a plurality of panel sections, each panel section comprising spaced-apart upper and lower plates, a corrugated web interposed between and secured to said plates, hollow beam members C-shaped in cross section secured to the side edges of each panel section and having a continuous slotted opening in one side wall thereof, the ends of the plates being curved over the outer vertical face of the beams, and a locking beam accommodated in said slotted opening and interlockingly engageable in said hollow beam for securing the panel sections tightly together to form a continuous flush upper and lower surface.

4. The combination set forth in claim 3 in which the ends of the upper and lower plates are firmly locked between the beams of the adjacent panel sections.

5. A vehicle comprising a body including sides, the lower portions of which are in the form of girders extending from end to end of the body, each girder including a relatively high vertically extending side wall with vertically spaced, inwardly projecting legs formed on the lower end section thereof, and a vertical, longitudinally extending rib formed on the upper inwardly projecting leg of said girder member at a point spaced inwardly from the side wall to form a channel between said rib and the wall to accommodate the side wall of a vehicle body therebetween, a plurality of transversely disposed, flat floor sections supported by said girders, with the ends of the sections inserted between and secured to said inwardly projecting legs, certain of said floor sections having pre-formed, hollow, beam members, C-shaped in cross section, on the edges thereof, and a locking member having slidable interlocking engagement with the adjacent beam members for securing the floor sections rigidly together to form a lightweight, rigid body.

HOWARD COLEMAN.

REFERENCES CITED

The following references are of record in the file of this patent:

UNITED STATES PATENTS

| Number | Name | Date |
|---|---|---|
| 1,223,912 | Waterman | Apr. 24, 1917 |
| 1,486,046 | Smith | Mar. 4, 1924 |
| 1,675,317 | Burke | July 3, 1928 |
| 1,965,601 | Kotrbaty | July 10, 1934 |
| 2,022,869 | Reid | Dec. 3, 1935 |
| 2,263,511 | Lindsay | Nov. 18, 1941 |
| 2,363,170 | Fontaine | Nov. 21, 1944 |
| 2,405,643 | Crot | Aug. 13, 1946 |
| 2,427,937 | Willson | Sept. 23, 1947 |